United States Patent [19]

Schmidt et al.

[11] Patent Number: 4,683,505
[45] Date of Patent: Jul. 28, 1987

[54] ALTERNATELY CENTERED DISK PACK ASSEMBLY AND METHOD

[75] Inventors: Laurence J. Schmidt; Randall L. Severson, both of Rochester; Lyle R. Tufty, Elgin; Steven H. Voss, Rochester, all of Minn.

[73] Assignee: International Business Machines Corporation, Armonk, N.Y.

[21] Appl. No.: 685,433

[22] Filed: Dec. 24, 1984

[51] Int. Cl.⁴ .................. G11B 5/012; G11B 23/03
[52] U.S. Cl. ........................................ 360/98; 360/133
[58] Field of Search .............................. 360/86, 97–99, 360/133, 135, 137; 346/137; 369/261, 282, 287; 29/281.5, 467–468, 738; 74/573 R

[56] References Cited

U.S. PATENT DOCUMENTS

| | | | |
|---|---|---|---|
| 3,159,050 | 12/1964 | Wilson | 74/573 R |
| 3,817,088 | 6/1974 | Herbig | 73/66 |
| 3,854,347 | 12/1974 | Hellerich | 74/573 R |
| 3,964,341 | 6/1976 | Rabenhorst | 74/573 R X |
| 4,224,648 | 9/1980 | Roling | 360/97 |
| 4,358,803 | 11/1982 | Van Der Giessen | 360/99 |
| 4,561,035 | 12/1985 | McDorman et al. | 360/137 |

Primary Examiner—Stuart N. Hecker
Assistant Examiner—Benjamin E. Urcia
Attorney, Agent, or Firm—Bradley A. Forrest

[57] ABSTRACT

A disk pack assembly for use in a disk drive has disks which are alternately diametrically offset about a spindle axis of rotation. The disks are positioned as a function of their outer edges such that alternate opposite outer edges line up as though they were the outer edges of centered nominal diameter disks. This results in an increase in the number of axial nodal points for potential imbalance moments and reduces the amplitude of associated vibrations. Disk spacers are also alternately diametrically offset about the spindle axis so tht pairs of like components tend to balance each other to minimize potential vibrations.

12 Claims, 3 Drawing Figures

ALTERNATELY CENTERED DISK PACK ASSEMBLY AND METHOD

BACKGROUND OF THE INVENTION

The present invention relates to disk storage devices and in particular to balancing a disk pack assembly about a disk spindle axis of rotation.

Disk assemblies usually comprise a plurality of disks with information stored on annular tracks closely packed together to increase data density. The disks are fastened about a hub. The disk assemblies rotate at high speeds to decrease the time it takes to obtain data via a sensing head which is substantially stationary with respect to the rotation of the disks, but shifts radially across the data tracks to sense data on different tracks.

An out of balance condition in the rotating disk assembly causes erratic speed variations with respect to the tracks and the sensor which results in read/write errors, planar and axial vibrations of the disk surfaces which contribute to sensor crashes destroying both the sensor and the disk surface, and decreased bearing life of disk drives.

Prior attempts to solve the above problems involved designing and manufacturing disks and hubs to tight tolerances to attain as close a fit between the inner diameter of the disks and the outer diameter of the hub as possible to center the rotating mass with respect to the axis of rotation of the disk assembly. This still resulted in out of balance conditions because of the inability to attain perfect fits and uniformly balanced disks. To obtain better balance, balance rings were used. By either adding or removing material from the balancing ring as indicated by sophisticated balancing equipment better balance was obtained, but at the expense of further steps following assembly of the disk packs.

U.S. Pat. No. 4,358,803 to Van Der Giessen describes accurately machined inner walls of disc central openings and a centering element which cooperates with at least one of the inner walls to center disks. In U.S. Pat. No. 4,224,648 to Roling, centering was performed using a steel centering ball in the center of a disk pack having a hemispherical surface facing a spindle cup. Centering with respect to the inner walls of a disk does not ensure that the disk is centered with respect to the majority of rotating mass of the disks which lies almost entirely outside the inner wall of the disk. The outer diameter of a disk may not be perfectly concentric with the inner diameter of the disk. Thus, centering with respect to the inner diameter of the disks requires high precision in aligning disks before the fastening of the disks to the hub and neglects some of the major causes of imbalance.

The above methods of centering and fastening disks also lead to particle generation which degrades performance of disk drives. Mating surfaces, such as the machined inner walls of disc central openings and the centering element in U.S. Pat. No. 4,358,803 and the steel ball and spindle cup in U.S. Pat. No. 4,224,648 are designed to slide while subjected to pressures until mating occurs. This sliding produces undesirable particles. Clamping by use of screws is also a notorious source of particulate contamination.

SUMMARY OF THE INVENTION

A spindle hub means is rotatingly coupled to a disk drive apparatus for providing a spindle axis about which a disk pack assembly is rotated. A first disk means is coupled to the spindle hub means for storing information and has an outer diameter substantially equal to a desired diameter. A second disk means is coupled to the spindle hub means a desired distance from the first disk means along the spindle hub means and has a diameter substantially equal to the desired diameter. The first and second disk means are diametrically offset about the spindle hub means as a function of the diameters of the first and second disk means relative to the desired diameter.

During assembly, the outer edges of the disks are used as registration surfaces. Tooling elements engage the edges from opposite directions in the same plane as the disks which are loosely stacked. The tooling surfaces for each disk stop in a position which corresponds to the exact location as if a nominally sized disk were to be perfectly centered with respect to the axis of rotation provided by the spindle. The tooling on both sides of the disks comprises registration contact points and registration plungers. The registration contact points provide two contact points for each disk to register the outer diameter of each disk in a kinematic manner. The registration plungers provide a force to drive the associated disks against the two registration surfaces on the opposite tooling. The tooling is arranged such that alternate disks are driven against tooling stops corresponding to desired positions of nominally sized disks in opposite directions.

Use of the outer edges of the disks as registration surfaces provides easy access for the tooling elements. Mass distribution of the disks is greater toward the outer edges. Positioning disks by use of the outer edges of the disks assures that the part of the disk having greatest mass, and largest affect on the balance condition is positioned to reduce vibration.

In one preferred embodiment, a disk pack is comprised of 4 disks and 3 spacers, one between each disk. With disks numbered consecutively, disks 1 and 3 are driven against nominal stops in one direction and disks 2 and 4 are driven against nominal stops in the opposite direction. The spacers are similarly driven in alternate directions against nominal stops by equivalent tooling. The disks and spacers are then locked into place.

The resulting structure minimizes planar imbalance, paired planar imbalances and axial imbalance in the disk pack by increasing the number of axial nodal points for potential imbalance moments. The amplitude of associated vibrations caused by imbalance is minimized by the increase in the number of axial nodal points. Thus, speed variations and read/write errors are minimized and wear and tear on the disk drives is reduced.

Assembly of the disk packs by automation is also facilitated by the present invention. Disks and spacers need not be precisely placed about the spindle when inserted. Once inserted, registration tooling simply and accurately adjusts the positions of the disks and spacers prior to their being fixed in place about the spindle. The contact points of the registration tooling preferably comprise rollers to reduce particulate contamination. Since the disks are loosely stacked before centering, no high pressure sliding metal contact occurs during centering and few particles are generated.

DETAILED DESCRIPTION

Figure 1:
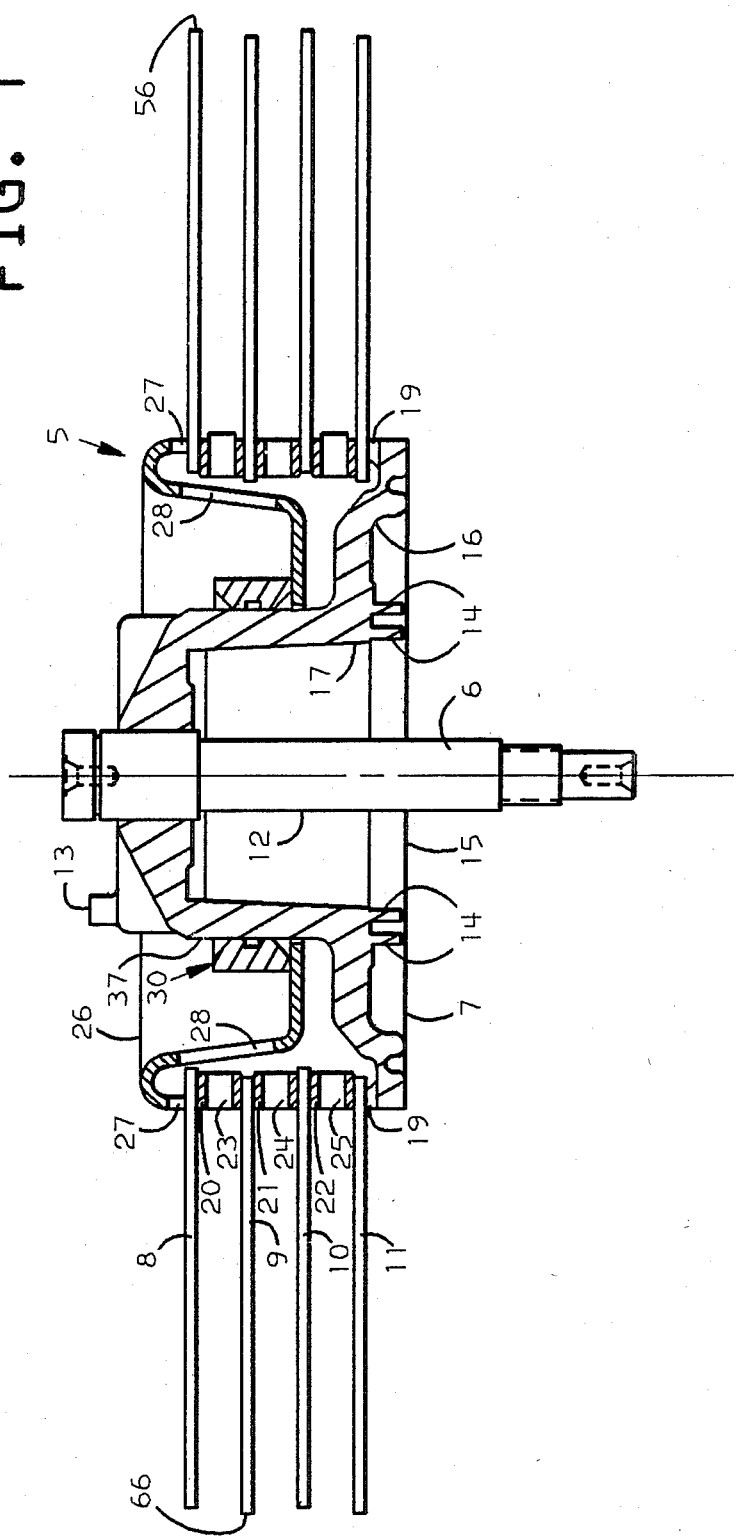
FIG. 1 is a vertical axial section of a spindle assembly for a disk drive data storage file incorporating alternately centered disks.

A spindle assembly 5 for a disk drive storage device in FIG. 1 includes a spindle shaft 6, a hub 7 and a pack or stack of disks, 8, 9, 10, and 11 which are alternately offset in substantially opposite directions. The spindle assembly 5 is substantially the same as a spindle assembly described in U.S. patent application Ser. No. 624,330, now U.S. Pat. No. 4,639,802, filed June 25, 1984 incorporated herein by reference and assigned to the same assignee as is the present application. The hub 7 is secured to spindle shaft 6 which has a generally cylindrical outer surface 12 surrounding which the disk stack is mounted. At the upper surface of the hub 7 a lug 13 projects which serves to align other parts attached to the hub as a part of the assembly. Annular projections 14 extending from a lower surface 15 of the hub 7 and the annular recess 16 cooperate with a disk drive base casting (not shown) that projects into a central annular recess 17 and surrounds the spindle surface 12.

The disks 8, 9, 10 and 11 are supported on hub 7 by projections 19 from hub 7 that define a radial surface supporting the disk stack in the upward axial direction. Three spacers 20, 21, and 22 are provided between the disks and each has a series of openings 23, 24 and 25 respectively. A bell clamp 26 has projections 27 which together with the hub projections 19 create peripherally disposed openings adjacent the upper most disk surface and the lower most disk surface respectively. The openings 28 in bell clamp 26 afford a continuous air path from axially above the disk assembly, through the space between the disk stack and the hub whereupon the air flow is partitioned to flow radially outwardly over each of the disk surfaces.

Clamping is effected by a heat shrink ring 30 which has an internal diameter slightly smaller than the outside diameter of hub 7 surface 37. The shrink ring 30 is heated to expand the inner diameter and then pressed firmly against bell clamp 26. As it cools, the inner diameter of the shrink ring 30 decreases, clamping the disks and spacers firmly in place. While clamping by use of shrink ring is preferable, other forms of fixing disks and spacers in their desired positions are available, such as by a clamp screwed to the hub, or a clamp screwed with a single screw into the spindle center.

Figure 2:
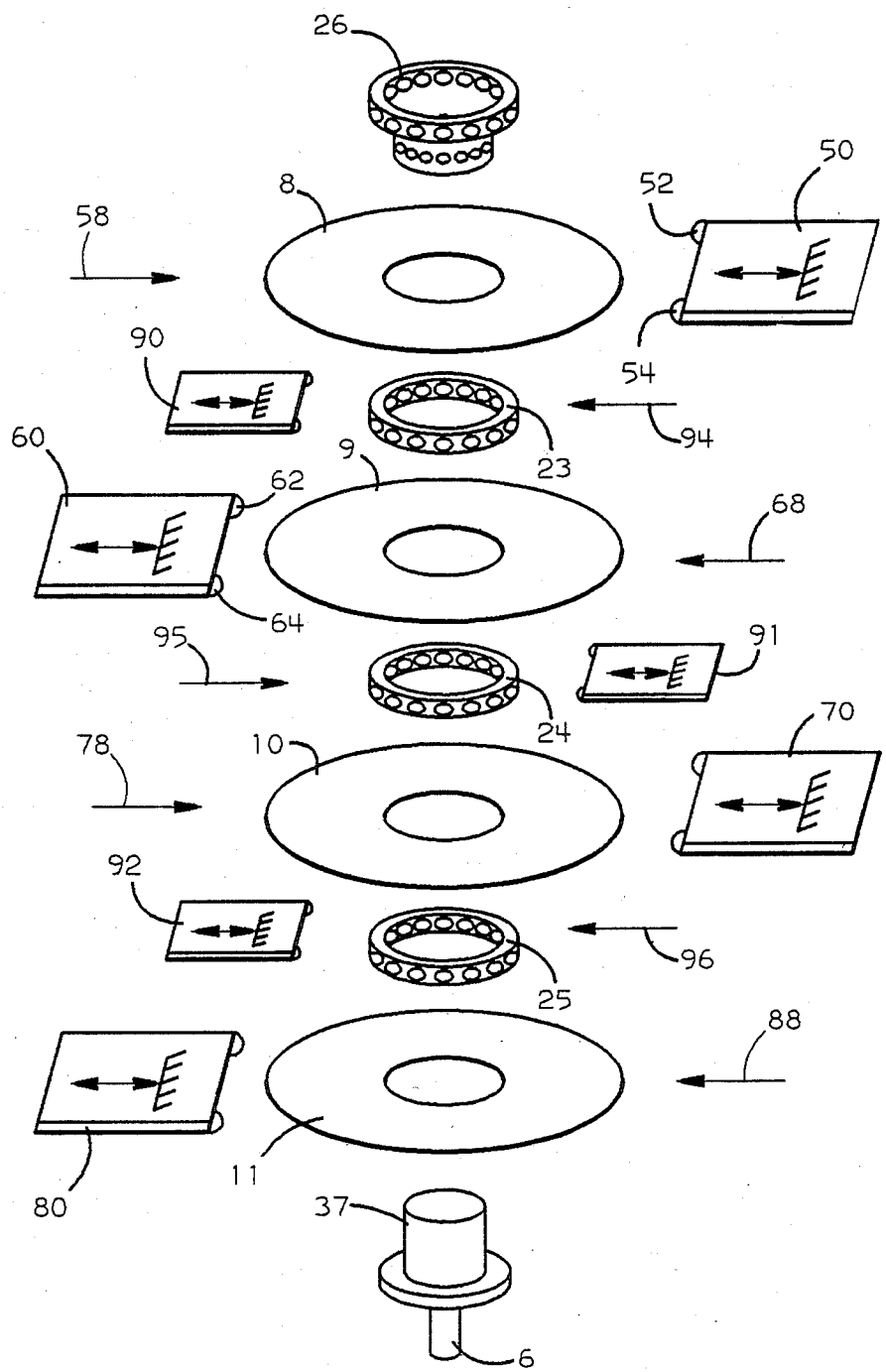
FIG. 2 is an exploded perspective of a disk pack assembly showing tooling used to alternately center disks and spacers.

Assembly of the disk pack is shown in FIG. 2 wherein the numbering is consistent with FIG. 1. Disk 11 is loosely inserted over hub surface 37 followed by spacer 25, disk 10, spacer 24, disk 9, spacer 23, disk 8 and bell clamp 26. The outer diameter of hub surface 37 is preferably substantially less than the inner diameter of the disks and spacers. This promotes ease of insertion and balancing of disk pack components and reduces disk pack shift problems caused by relative movement of pack components in response to expansion and contraction of the hub 7.

Before the disk pack is clamped into place by shrink ring 30, a plurality of tooling surfaces act on the outer diameters of the disk pack components to diametrically offset the components about the spindle 6 as a function of the diameters of the components. A first registration arm 50 extends from the right side of the page, or a first direction and provides two contact points 52 and 54 to register the outer diameter of disk 8 to a position indicated at 56 in FIG. 1. The position at 56 substantially corresponds to the position that the outer diameter of a nominally sized disk would attain if centered about the spindle 6. A registration plunger represented at 58 in FIG. 2 provides a force to drive the disk 8 against the two registration contact points 52 and 54.

A second registration arm 60 provides two contact points 62 and 64 to register the outer diameter of disk 9 to a position indicated at 66 in FIG. 1 which substantially corresponds to the position that the outer diameter of a nominally sized disk would attain if centered about the spindle 6. The second registration arm 60 extends toward disk 9 from the left, or a second direction which is substantially opposite or diametric from the first direction registration arm 50 extends toward disk 8. A registration plunger represented at 68 provides a force to drive the disk 9 against the two registration contact points 62 and 64. Similarly, disks 10 and 11 are positioned from the first and second directions respectively by registration arm 70 and plunger 78 and registration arm 80 and plunger 88.

The disks are now alternately diametrically offset about the spindle 6 such that imbalance moments caused by variations in mass distribution about the spindle axis in the disks from a nominal sized disk are spread out over an increased number of axial nodal points to minimize the amplitude of the associated vibrations. Use of the outer diameter of the disks as a registration surface takes into consideration the concentrated mass distribution at the outer diameter of the disks and its increased vibrational effect if unbalanced.

The spacers 23, 24 and 25 are also alternately diametrically offset about the spindle 6 by corresponding registration arms 90, 91 and 92 in conjunction with registration plungers 94, 95 and 96. The spacers and disks are independently offset, preferably simultaneously as groups because of the differences in rotational masses. The actual amount of offset of the centers of the disks from the spindle axis of rotation is exaggerated in FIG. 1 for illustration purposes. Disks and spacers are manufactured to fairly tight tolerances, and the offset functions to ensure that whatever difference exists in individual disks and spacers does not act in concert to create undesirable vibrations.

In one preferred embodiment, the outer diameter of the disks is manufactured to a tolerance of plus or minus 0.005 centimeters. As an example, disks 8, 9, 10, and 11 in FIG. 1 are indicated as being up to 0.005 centimeters smaller than a nominal disk by disks 8 and 10 being shifted to the right with respect to disks 9 and 11. If the disks are larger than nominal, disks 8 and 10 would appear shifted to the left with respect to disks 9 and 11. The outer diameter tolerance defines the largest expected offsets, and the above example is given merely to indicate the benefits obtained even from what appear to be small offsets.

Preferably, pairs of similar components are oppositely registered to achieve offsetting in balanced pairs which imbalances tend to cancel as by creating a node point. In a further embodiment, the bell clamp is offset in alternate order consistent with the spacers to further improve balance.

Figure 3:
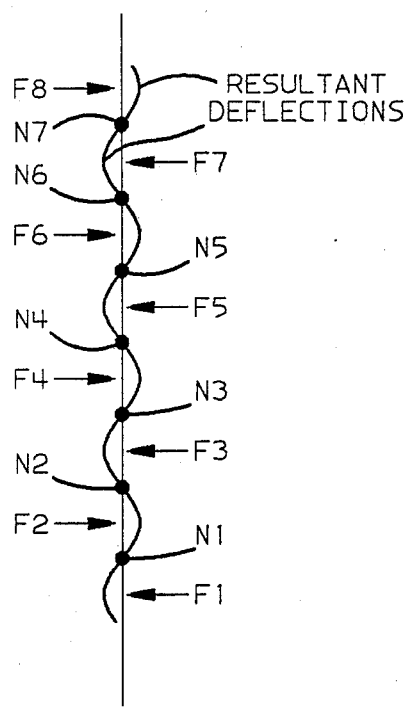
FIG. 3 is an ideal graphic representation of reduced imbalance showing amplitude and axial nodal points of vibration of the disk pack assembly of FIG. 2 when assembled and rotated.

FIG. 3 is a representation of ideal vibrational deflections from the superposition of the nodes created by the offset disks and the nodes created by the offset spacers and shrink ring. F1 through F8 correspond to forces created by minor imbalances of individual components ranging from disk 11 to clamp 26. Nodal points are indicated by dots 1 through 7. By increasing the number of nodal points, the potential deflections of the disks and spacers are reduced by the decrease in axial distance between the nodes. Other numbers of disks and spacers besides 4 and 3 respectively can be similarly offset. While it is preferable that an even number of disks be offset in pairs because of their mass being at a greater radial distance than that of the spacers, the use of an odd number of disks is within the scope of the invention.

By offsetting adjacent like components, a large number of nodes is created. An optimum number of nodes is created when the disks are substantially equal in diameter. This usually occurs during manufacture of a batch of disks. Diameter variations from batch to batch are within tolerance, but are usually greater than the variations within a single batch. Use of disks from different batches may result in one disk being smaller than nominal and the adjacent disk being larger than nominal. Thus, use of disks from a single batch increases the likelihood that the disk diameters are substantially equal which increases the number of nodes.

Offsetting of components other than by alternatingly offsetting adjacent like components is within the scope of the present invention, but may not provide optimum offsets. Analysis of offsets can be performed by using known beam loading techniques. Thus, oppositely offsetting adjacent components as a function of their relative mass distributions, or oppositely offsetting pairs of adjacent like components are further embodiments that increase the number of vibrational node points and reduce the amplitudes of vibration.

Particle generation during assembly is minimized by the registration contact points comprising rollers. The pack components move on the rollers and pivot on the plungers, which are in effect, pivot surfaces. Thus, there is no sliding contact made with the registration surfaces which could form particles to degrade performance of the disk drive.

Few particles are generated in placing the disk components over the hub because of the small size of the hub. In a further embodiment, the smaller hub size permits balancing to occur by the use of registration surfaces contacting the inner diameter disk and spacer surfaces through holes 28 in clamp 26. The disks and spacers are similarly positioned to increase the number of vibration node points while the heat shrink ring 30 is positioned and cooled to secure the disks and spacers in place.

Since in the preferred embodiment, the components are clamped into position without the use of inherently particle producing screws, and few particles are generated during balancing due to the roller and pivot registration surface, the total particle count developed during assembly is greatly reduced over prior art assembly methods. The enhanced balance provided by diametrically offsetting components to alternate positions corresponding to nominal components also results in less bending of the spindle, reducing the potential for disk radial run-out.

What is claimed is:

1. A disk pack assembly for use in a disk drive wherein the disk pack assembly is rotated within the disk drive apparatus, the disk pack assembly comprising:

spindle hub means rotatingly coupled to the disk drive apparatus for providing a spindle about which the disk pack assembly is rotated;

first disk means coupled to the spindle hub means for storing information and having an outer diameter substantially equal to a desired diameter; and second disk means coupled to the spindle hub means a desired distance from the first disk means along the spindle hub means for storing information and having an outer diameter substantially equal to the desired diameter;

wherein opposite edges of adjacent disk means are diametrically offset about the spindle hub means so that said opposite edges are at a distance from the axis of the spindle hub means substantially equal to the desired diameter.

2. A disk pack assembly for use in a disk drive wherein the disk pack assembly is rotated within the disk drive apparatus, the disk pack assembly comprising:

spindle hub means, having an outer diameter, rotatingly coupled to the disk drive apparatus for providing a spindle axis about which the disk pack assembly is rotated;

a plurality of data disks coupled to the spindle hub means for rotating about the spindle hub means and having outer diameters substantially equal to a desired disk diameter, and having an inner diameter substantially greater than the outer diameter of the spindle hub means, wherein the data disks are alternately offset in opposite directions about the spindle axis; each data disk being offset to the extent the outer diameter of the data disk varies from the desired disk diameter whereby the number of axial nodal points for potential imbalance moments is increased.

3. The disk pack assembly of claim 2 and further comprising a plurality of spacer means dispersed between the data disks for maintaining a desired gap between the data disks to permit sensing of data on said data disks, the spacer means having outer diameters substantially equal to a desired spacer outer diameter.

4. The disk pack assembly of claim 3 wherein the spacer means are substantially alternately diametrically offset about the spindle hub means as a function of the outer diameters of the spacer means to increase the number of axial nodal points for potential imbalance moments.

5. The disk pack assembly of claim 4 and further comprising an annular clamp means coupled to the spindle hub means for rigidly clamping the disk means and the spacer means, the clamp means having an outer diameter substantially equal to a nominal clamp outer diameter and being alternately diametrically offset about the spindle means in conjunction with the spacer means.

6. The disk pack assembly of claim 2 wherein the disks are from the same batch of manufactured disks to minimize variations in their diameters, thereby ensuring an increase in the number of axial nodal points.

7. A method of assembling a disk pack having a spindle hub and a plurality of data disks having outer diameters substantially equal to a nominal disk diameter, comprising the steps of:

inserting the data disks moveably about the spindle hub;

positioning outer edges of alternate disks to substantially diametrically opposite positions corresponding to expected positions of the outer edges of nominal diameter disks centered about the spindle hub; and fixing the disks in said positions.

8. The method of claim 7 and further comprising the steps of inserting spacers between the disks while inserting the disks and positioning alternate diametric edges of the spacers to positions corresponding to nominal diameter spacers centered about the spindle hub.

9. The method of claim 8 wherein the disks and spacers are positioned substantially simultaneously.

10. The method of claim 8 wherein the disks and spacers are simultaneously positioned by a set of registration contact points and registration plungers acting on the outer edges of the disks and spacers.

11. The method of claim 10 wherein the registration contact points comprise pairs of rollers for rollingly contacting the disk and spacer outer edges such that particle generation is minimized.

12. The method of claim 11 wherein the registration plungers comprise pivoting surfaces on which the disks and spacers pivot during positioning such that few particles are generated.

* * * * *